(12) United States Patent
Bischofberger et al.

(10) Patent No.: US 8,720,319 B2
(45) Date of Patent: May 13, 2014

(54) CYLINDER SLEEVE

(75) Inventors: Ulrich Bischofberger, Esslingen (DE); Stefan Gaiselmann, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 803 days.

(21) Appl. No.: 12/928,104

(22) Filed: Dec. 3, 2010

(65) Prior Publication Data
US 2011/0154983 A1 Jun. 30, 2011

(30) Foreign Application Priority Data

Dec. 3, 2009 (DE) .......................... 10 2009 056 919

(51) Int. Cl.
*F16J 10/04* (2006.01)
(52) U.S. Cl.
USPC ...................................... 92/169.1; 123/193.2
(58) Field of Classification Search
USPC .............. 92/169.1, 169.4, 171.1; 29/888.061; 123/193.2; 411/411, 412, 413, 339
See application file for complete search history.

(56) References Cited

U.S. PATENT DOCUMENTS

| | | | |
|---|---|---|---|
| 3,165,983 A | 1/1965 | Thomas | |
| 7,171,935 B2 * | 2/2007 | Komai et al. | 123/193.2 |
| 7,383,805 B2 | 6/2008 | Michioka et al. | |
| 2010/0059012 A1 * | 3/2010 | Tachibana et al. | 123/193.2 |

FOREIGN PATENT DOCUMENTS

| | | |
|---|---|---|
| DE | 549 560 | 4/1932 |
| DE | 10 2009 043 928 | 3/2010 |
| EP | 0 919 715 | 6/1999 |
| EP | 1 711 291 | 10/2006 |
| JP | 2007-321576 | 12/2007 |
| JP | 2009-013836 | 1/2009 |

OTHER PUBLICATIONS

German Search Report dated Aug. 5, 2010 with English translation of the relevant parts.

* cited by examiner

*Primary Examiner* — Edward Landrum
*Assistant Examiner* — Logan Kraft
(74) *Attorney, Agent, or Firm* — Collard & Roe, P.C.

(57) ABSTRACT

The present invention relates to a cylinder sleeve (10) having an outer mantle surface (11) that has a surface structure (12, 112, 212). According to the invention, it is provided that the mantle surface (11) is provided with elevations (13, 113, 213; 14, 118, 219), that each elevation (13, 113, 213; 14, 118, 219) has at least one rounded area (16, 116, 216) in the region of its base (B), that some of the elevations (13, 113, 213) have at least one undercut (15, 115, 215), and that at least one elevation (14, 118, 219) without undercut is disposed between two elevations (13, 113, 213) with undercut (15, 115, 215).

16 Claims, 3 Drawing Sheets

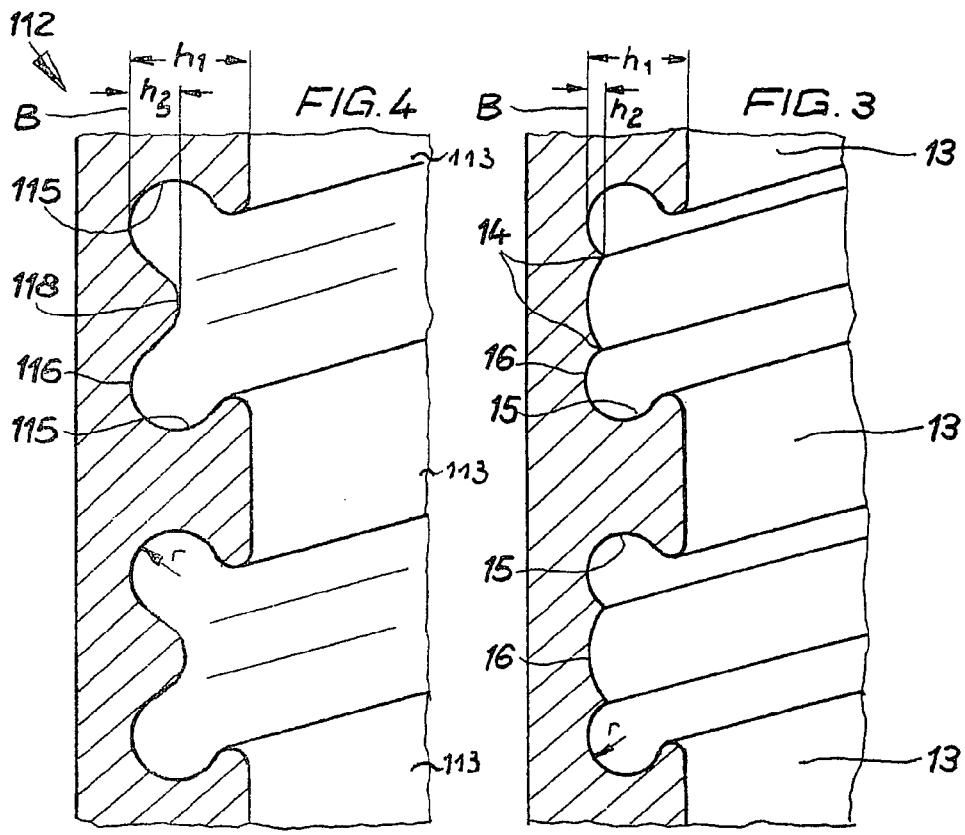
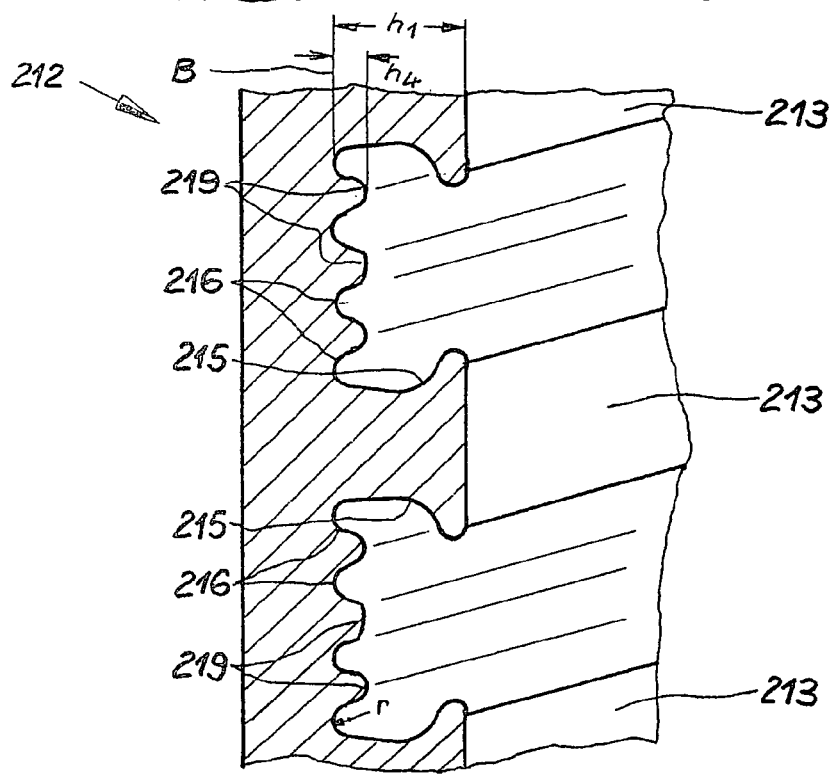

CYLINDER SLEEVE

CROSS REFERENCE TO RELATED APPLICATIONS

Applicants claim priority under 35 U.S.C. §119 of German Application No. 10 2009 056 919.7 filed Dec. 3, 2009, the disclosure of which is incorporated by reference.

BACKGROUND OF THE INVENTION

1. Field of the Invention

The present invention relates to a cylinder sleeve having an outer mantle surface that has a surface structure.

Cylinder sleeves for internal combustion engines are generally cast together with the crankcase. For this purpose, the cylinder sleeves are placed into a casting mold and the material of the crankcase is cast around them.

For the production of a crankcase for internal combustion engines, composed of a light metal material, generally ductile and high-strength aluminum alloys are used. The cylinder sleeves preferably consist of cast iron or a wear-resistant aluminum alloy. In this connection, however, no material-fit connection between the materials, i.e. no metallic bond between the material of the crankcase and the material of the cylinder sleeve, is formed. Therefore sufficient shape fit between the cylinder sleeves and the crankcase must be ensured.

2. The Prior Art

Cylinder sleeves are known from U.S. Pat. No. 3,165,983, which have ribs configured in star shape along their outer mantle surface, which ribs extend in the direction of the center axis of the cylinder sleeve and are introduced into the mantle surface by means of mechanical machining. It proves to be disadvantageous, in this connection, that gaps or interstices can form between the cylinder sleeve and the material of the crankcase, in the radial direction, as the result of tensile stress. As a result, local disruptions of the heat transfer between cylinder sleeve and crankcase can occur during engine operation. This results in a non-uniform temperature distribution in the cylinder, which in turn can lead to cylinder distortions, i.e. to deformation of the cylinders. Therefore the seal of the combustion chamber situated above the piston head, by means of the piston rings, is also impaired. As a known preventive measure, the piston rings are structured to have particularly high tangential contact forces. However, this leads to increased friction power and thus to increased fuel consumption during engine operation.

In order to counteract this problem, it is therefore desirable to produce a shape-fit connection between the cylinder sleeves and the crankcase, in such a manner that the connection does not come loose under tensile stress in the radial direction. It is known from EP 0 919 715 B1 to provide the mantle surface of cylinder sleeves with rib-shaped elevations, configured in the manner of a parallelogram, a trapezoid, or T shape in cross-section. Because of the clamping effect, a shape-fit connection between the cylinder sleeve and the crankcase is produced when casting takes place around such cylinder sleeves. It is proposed to produce such a surface structure by means of cutting work and/or plastic deformation. However, the production of such surface structures by means of forming methods is very complicated. Production by means of cutting work has the disadvantage that a suitable contour tool is required for this purpose, in order to achieve the desired undercuts. Furthermore, it has been shown that such tools wear out too fast, due to local overheating, particularly in the corner region.

SUMMARY OF THE INVENTION

The task of the present invention therefore consists in making available a cylinder sleeve having an outer mantle surface that has a surface structure, which can be produced with as little effort as possible, and nevertheless guarantees reliable shape fit as well as the greatest possible heat transfer to the crankcase, and thus a uniform temperature distribution in the cylinder.

The solution consists in that the mantle surface is provided with elevations, that each elevation has at least one rounded area in the region of its base, that some of the elevations have at least one undercut, and that at least one elevation without an undercut is disposed between two elevations with an undercut.

It has surprisingly been found that it is sufficient to provide only some of the elevations with at least one undercut. By means of this measure, a very good mechanical clamping effect is achieved, and gap formation between the materials of the cylinder sleeve and of the crankcase is reliably avoided. The heat-conducting contact between cylinder sleeve and crankcase is also very uniform, with very good heat transfer, since the increase in size of the effective surface area of the cylinder sleeve is sufficient, without every elevation having to be provided with undercuts. The heat that occurs in the combustion chamber of the engine can therefore be easily passed on to the cooling water through the cylinder wall. The holding force of the cylinder sleeve in the crankcase, in the tangential direction, is also extremely satisfactory. The inner machining of the cylinder sleeve, which follows by cutting after the sleeve is cast in, can be carried out at a clearly higher cutting power, without the cylinder sleeve turning out of its original position. Since fewer undercuts have to be produced, the production of the cylinder sleeve according to the invention is less complicated. It was also surprisingly found that as the result of the formation of rounded areas in the region of the base of each elevation, the tools required for this purpose are subject to less stress and their useful lifetime is significantly improved. The cylinder sleeve according to the invention therefore combines the demands with regard to very good shape fit in the crankcase and the demands with regard to production that is not very complicated, in a particularly efficient manner.

Advantageous further developments are evident from the dependent claims.

The at least one rounded area preferably has a rounding radius of at least 0.2 mm, particularly preferably of 0.4 mm to 0.8 mm. With this, it was possible to achieve a particularly good machining result, both with regard to the shape-fit connection between cylinder sleeve and crankcase, and with regard to the useful lifetime of the tools used.

The elevations with undercuts preferably have a radial height between 0.7 and 1.6 mm, which is greater, in each instance, than the radial heights of the elevations without undercut. In this way, the shape fit between cylinder sleeve and crankcase is further improved. This result can also be achieved or reinforced in that the radial heights of the elevations with undercut are dimensioned to be greater by a factor of 1.5 to 15 than the radial heights of the elevations without undercut.

The elevations can have any desired configuration, but are preferably configured as lands, beads, ribs, or spines. The elevations are furthermore preferably configured to run around the outer mantle surface, since this can be produced in particularly simple manner. The elevations can particularly be configured to run around in spiral shape.

The elevations can furthermore be configured over a partial region of the outer mantle surface, in the axial direction. In this way, production is further simplified, and the production time is shortened, without any significant losses in the shape fit and in the heat conduction capability taking place. For example, the elevations can be configured in the center region of the outer mantle surface.

The elevations can furthermore have at least one run-in zone and/or at least one run-out zone, so that the material of the crankcase can sheathe the elevations without problems and completely when the cylinder sleeve is cast in.

It is advantageous if the elevations are produced using a cutting method, since the tools required for this are subject to less stress than before, because of the reduced production effort.

The surface structure provided according to the invention is suitable for all types of cylinder sleeves, for example those whose outer mantle surface is configured to be partly narrowed and/or partly widened, and/or configured to be oval in cross-section.

BRIEF DESCRIPTION OF THE DRAWINGS

Exemplary embodiments of the present invention will be explained in greater detail in the following, using the attached drawings. The figures show, in a schematic representation, not to scale:

FIG. 3 an enlarged representation of the elevations according to FIG. 1;

FIG. 4 an enlarged representation of another exemplary embodiment of elevations according to the invention;

FIG. 5 an enlarged representation of another exemplary embodiment of elevations according to the invention.

DETAILED DESCRIPTION OF PREFERRED EMBODIMENTS

Figure 1:
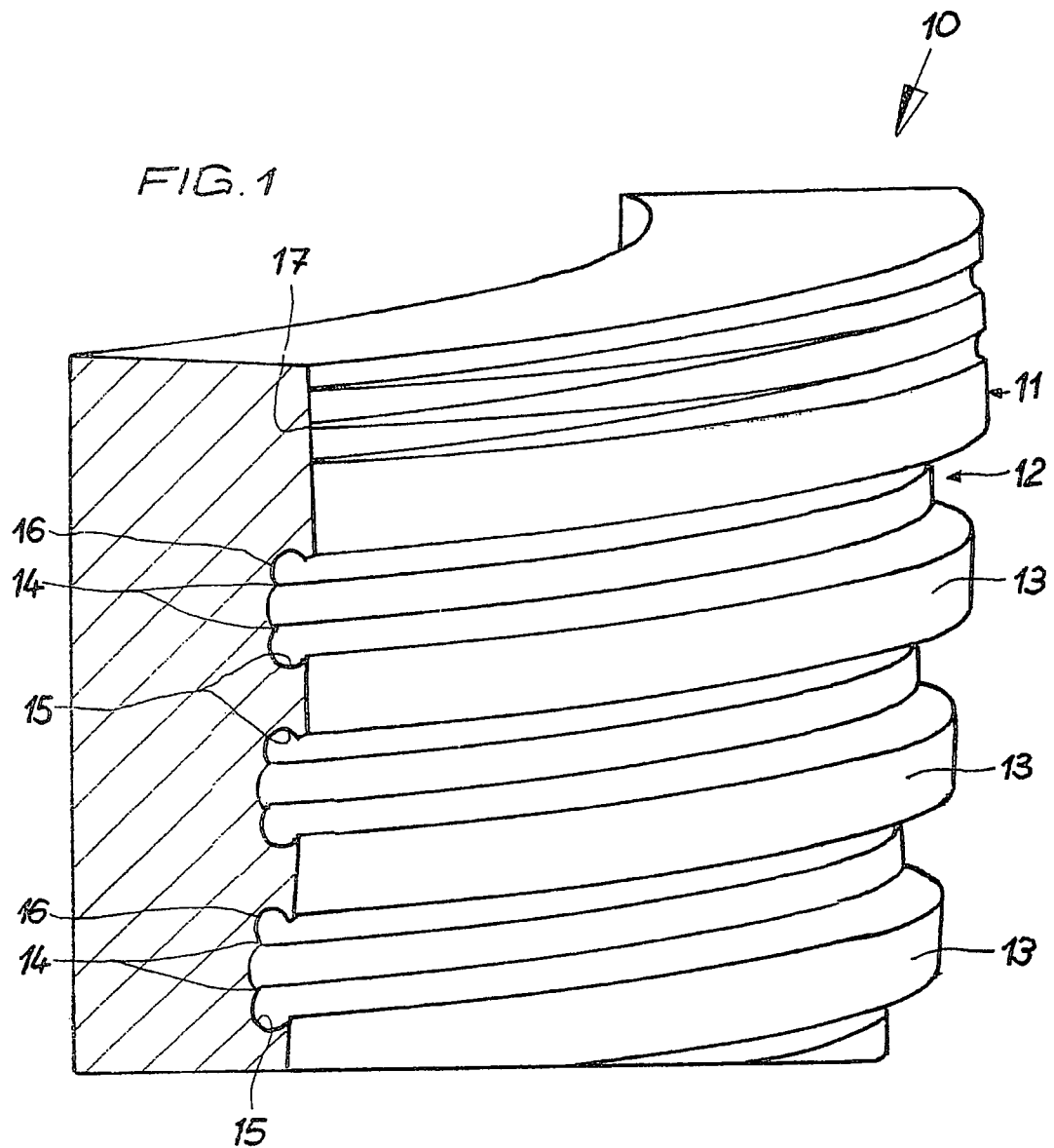
FIG. 1 a first exemplary embodiment of a cylinder sleeve according to the invention, in an enlarged perspective partial representation, partly in section.
Figure 2:
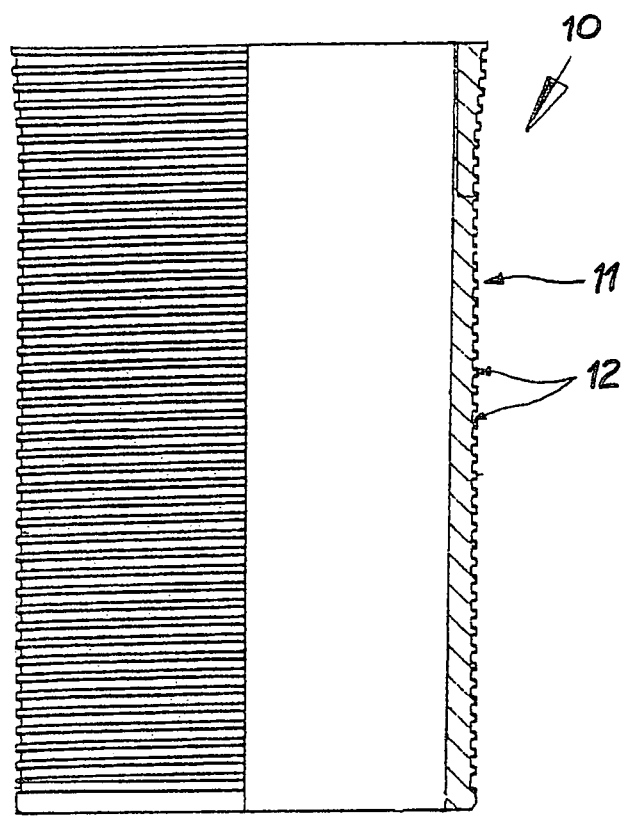
FIG. 2 the cylinder sleeve according to FIG. 1, in an overall view, half in section.

FIGS. 1 to 3 show a first exemplary embodiment of a cylinder sleeve 10 according to the invention, having a surface structure 12 according to the invention. The cylinder sleeve 10 is produced from cast iron, for example, or from a wear-resistant aluminum alloy. The outer mantle surface 11 of the cylinder sleeve 10 can be configured to be partly narrowed and/or partly widened and/or oval in cross-section. In the exemplary embodiment, the outer mantle surface 11 is provided with a surface structure 12 that runs in spiral shape, at a uniform incline. FIG. 2 shows the cylinder sleeve in an overall view, whereby the left half shows a front view and the right half shows a sectional representation. In the exemplary embodiment, the entire mantle surface 11 of the cylinder sleeve 10 is provided with a surface structure 12. Of course, the surface structure 1 can also be configured only in the axial direction, over a partial region of the outer mantle surface 11, for example in the center region of the outer mantle surface 11 (not shown).

The surface structure 12 has elevations 13 and 14. The elevations 13 are configured essentially in the shape of a land, and provided with undercuts 15. The elevations 14 are configured essentially in the shape of a spine, and do not have any undercuts. In the exemplary embodiment, two elevations 14 without undercuts are disposed between two elevations 13 with undercuts 15. The elevations 13, 14 are provided with rounded areas 16 in the region of their base B (see FIG. 3). The elevations 13 have a radial height $h_1$ of 1.0 mm, the elevations 14 have a radial height $h_2$ of 0.1 mm. The rounding radius r of the rounded areas 16 amounts to 0.4 mm. The surface structure 12 is produced using a cutting method. At the upper end of the surface structure 12, the elevations 13, 14 form a run-out zone 17. In this manner, the formation of a sharp edge, at which cracks could form, for example, is avoided. Furthermore, the material for the crankcase can enter into the surface structure 12 uniformly and without eddies, when it is cast around the cylinder sleeve 10, by way of the run-out zone 17. At the opposite end of the surface structure 12 (not shown), a corresponding run-in zone can be provided.

FIG. 4 shows another exemplary embodiment of a surface structure 112, one that is suitable for a cylinder sleeve according to FIGS. 1 and 2, for example. The surface structure 112 also has elevations 113 and 118. The elevations 113 are configured essentially in the form of a land and provided with undercuts 115. The elevations 118 are configured essentially in the form of a bead and do not have any undercuts. In the exemplary embodiment, an elevation 118 without undercuts is disposed between two elevations 113 with undercuts 115. The elevations 113, 118 are provided with rounded areas 116 in the region of their base B. The elevations 113 have a radial height $h_1$ of 0.9 mm, the elevations 118 have a radial height $h_3$ of 0.4 mm. The rounding radius r of the rounded areas 116 amounts to 0.3 mm. The surface structure 112 is produced using a cutting method. Run-in zones and run-out zones can be provided, such as those presented in FIG. 1 for the first exemplary embodiment.

FIG. 5 shows another exemplary embodiment of a surface structure 212, one that is suitable for a cylinder sleeve according to FIGS. 1 and 2, for example. The surface structure 212 also has elevations 213 and 219. The elevations 213 are configured essentially in the form of a land and provided with undercuts 215. The elevations 219 are configured essentially in the form of a bead and do not have any undercuts. In the exemplary embodiment, three elevation 219 without undercuts are disposed between two elevations 213 with undercuts 215. The elevations 213, 219 are provided with rounded areas 216 in the region of their base B. The elevations 213 have a radial height $h_1$ of 1.5 mm, the elevations 219 have a radial height $h_4$ of 0.4 mm. The rounding radius r of the rounded areas 216 amounts to 0.2 mm. The surface structure 212 is produced using a cutting method. Run-in zones and run-out zones can be provided, such as those presented in FIG. 1 for the first exemplary embodiment.

What is claimed is:

1. A cylinder sleeve (10) comprising an outer mantle surface (11) that has a surface structure (12, 212), wherein the mantle surface (11) is provided with elevations (13, 213; 14, 219), wherein each elevation (13, 213; 14, 219) has two rounded areas (16, 216) in the region of its base (B), wherein some of the elevations (13, 213) have two undercuts (15, 215), and wherein at least two elevations (14, 219) without undercut are disposed between two of the elevations (13, 213) with undercut (15, 215).

2. The cylinder sleeve according to claim 1, wherein the elevations with undercut (15, 215) have a height ($h_1$) between 0.7 mm and 1.6 mm.

3. The cylinder sleeve according to claim 1, wherein the at least one rounded area (16, 216) has a rounding radius (r) of at least 0.2 mm.

4. The cylinder sleeve according to claim 3, wherein the at least one rounded area (16, 216) has a rounding radius (r) between 0.4 mm and 0.8 mm.

5. The cylinder sleeve according to claim 1, wherein the elevations (13, 213) with undercut (15, 215) have a radial height h1 that is greater, in each instance, than the radial heights $h_2$, $h_3$, $h_4$ of the elevations (14, 219) without undercut.

6. The cylinder sleeve according to claim 5, wherein the radial heights $h_1$ of the elevations (13, 213) with undercut (15, 215) are dimensioned to be larger by a factor of 1.5 to 15, in each instance, than the radial heights $h_2$, $h_3$, $h_4$ of the elevations (14, 219) without undercut.

7. The cylinder sleeve according to claim 1, wherein the elevations (13, 213; 14, 219) are configured as lands, beads, ribs, or spines.

8. The cylinder sleeve according to claim 1, wherein the elevations (13, 213; 14, 219) are configured to run around the outer mantle surface (11).

9. The cylinder sleeve according to claim 8, wherein the elevations (13, 213; 14, 219) are configured to run around the outer mantle surface (11) in spiral shape.

10. The cylinder sleeve according to claim 1, wherein the elevations (13, 213; 14, 219) are configured over a partial region of the outer mantle surface (11), in the axial direction.

11. The cylinder sleeve according to claim 10, wherein the elevations (13, 213; 14, 219) are configured in the center region of the outer mantle surface (11).

12. The cylinder sleeve according to claim 1, wherein the elevations (13, 213; 14, 219) have at least one run-in zone and/or at least one run-out zone (17).

13. The cylinder sleeve according to claim 1, wherein the elevations (13, 213; 14, 219) are produced by means of a cutting method.

14. The cylinder sleeve according to claim 1, wherein its outer mantle surface (11) is configured to be partly narrowed and/or partly widened and/or oval in cross-section.

15. The cylinder liner according to claim 1, wherein the elevations (13) with undercuts (15) are configured in the shape of a land, wherein the elevations (14) without undercuts are configured in the shape of a spine, and wherein two elevations (14) without undercuts are disposed between two elevations with undercuts.

16. The cylinder liner according to claim 1, wherein the elevations (213) with undercuts (215) are configured in the shape of a land, wherein the elevations (219) without undercuts are configured in the shape of a bead, and wherein three elevations (213) without undercuts are disposed between two elevations (213) with undercuts (215).

* * * * *